United States Patent [19]

Weicht et al.

[11] 4,056,444
[45] Nov. 1, 1977

[54] VACUUM SEPARATION OF MIXTURES WITH SIMILAR BOILING POINTS

[75] Inventors: Bodo Weicht; Karl Kleinhenz, both of Leverkusen, Germany

[73] Assignee: Bayer Aktiengesellschaft, Leverkusen, Germany

[21] Appl. No.: 564,395

[22] Filed: Apr. 2, 1975

[30] Foreign Application Priority Data

Apr. 24, 1974 Germany ............................ 2419723

[51] Int. Cl.² .............................................. B01D 3/10
[52] U.S. Cl. ......................................... 203/26; 203/91
[58] Field of Search .................................. 203/91–94, 203/26, 24; 159/17 P, 17 VS

[56] References Cited

U.S. PATENT DOCUMENTS

| | | | |
|---|---|---|---|
| 2,619,453 | 11/1952 | Andersen | 159/24 R |
| 2,645,104 | 7/1953 | Kniel | 62/26 X |
| 3,151,046 | 9/1964 | Larson | 203/93 |
| 3,177,129 | 4/1965 | Huckins, Jr. | 159/27 B |
| 3,230,155 | 1/1966 | Schurch | 203/26 |
| 3,414,484 | 12/1968 | Carson et al. | 203/26 |
| 3,788,954 | 1/1974 | Cantrell | 203/26 |

FOREIGN PATENT DOCUMENTS

| | | | |
|---|---|---|---|
| 209,838 | 6/1960 | Austria | 159/27 B |
| 562,476 | 11/1923 | France | 159/27 B |
| 427,780 | 7/1926 | Germany | 159/27 B |
| 37-14318 | 1962 | Japan | 159/27 B |

*Primary Examiner*—Norman Yudkoff
*Attorney, Agent, or Firm*—Burgess, Dinklage & Sprung

[57] ABSTRACT

This invention relates to the use of a heat pump in combination with a column having a low pressure loss for separating mixtures with similar boiling points in a vacuum of 10 Torr up to normal pressure. By using this arrangement, it is possible to separate isomers in particular, saving heat in relation to normal distillation.

9 Claims, 1 Drawing Figure

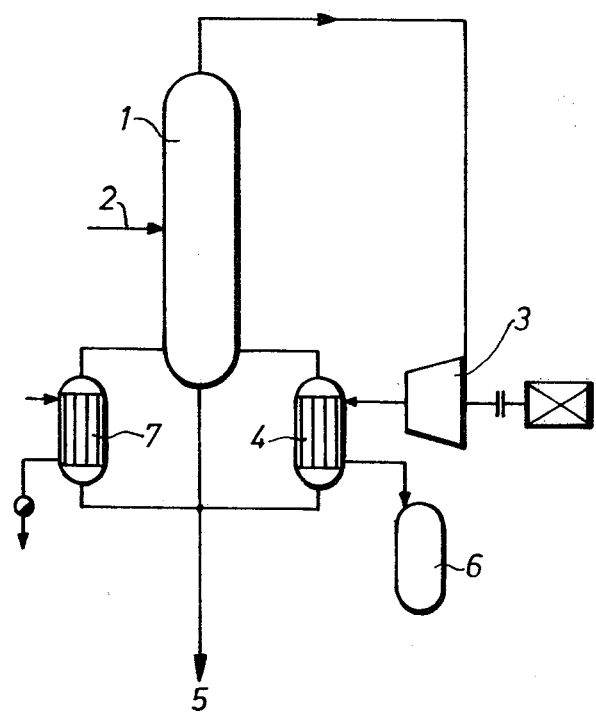

VACUUM SEPARATION OF MIXTURES WITH SIMILAR BOILING POINTS

This invention relates to the vacuum separation of mixtures of components having similar boiling points.

The separation of mixtures of components having similar boiling points into their individual components is a recurring problem, especially in chemistry. Rectification columns are primarily used for solving this problem. The conditions and difficulties of using rectification columns are described inter alia in Ullmanns Enzyklopadie der Technischen Chemie, vol 1, Chemischer Apparatebau und Verfahrenstecknik, Urban and Schwarzenberg Munich- Berlin, 1951, pp 429 et seq.

In cases where separation is carried out by distillation techniques, it has already been proposed to use heat pumps with a view to saving heat. The vapours accumulating at the head of the column are compressed and condensed in an evaporator whilst at the same time the column is heated. The principle of the heat pump, and examples of its application are described in more detail in: Ullmanns Enzklopadie der Technischen Chemie, vol 1, pp 279 et seq. A combination of both techniques can be used with economic advantage providing the columns function at or around normal pressure or excess pressure.

In the case of convential vacuum columns, there is no point in using heat pumps in view of the excessive pressure difference between the head and the sump of the column caused by the large number of plates required for separating mixtures of components having similar boiling points. In view of this marked pressure difference, the compression ratio of the heat pump would have to be so high that it would no longer be economically acceptable.

There are a number of product mixtures which cannot be separated by distillation under normal or elevated pressure because, under these conditions, the boiling temperature is above the decomposition temperature.

The object of the invention is to separate liquid mixtures with similar boiling points using a vacuum column and a heat pump.

According to the invention, there is provided an apparatus for separating mixtures of components having similar boiling points comprising a distillation column substantially free from pressure losses (as defined herein) in combination with a heat pump for supplying heat to the column.

There is also provided a process for separating mixtures of components having similar boiling points (as defined herein) wherein the mixture is distilled at a reduced pressure above 10 Torr in a distillation column to which heat is supplied by means of a heat pump.

The particular advantage of using a heat pump in combination with a vacuum column substantially free from pressure losses in accordance with the invention is that thermally unstable products in particular can be safely separated without damage using very little energy. In the context of the invention, the expression "similar boiling points" signifies a boiling-point difference of up to about 10° C, preferably 5° C. A vacuum column substantially free from pressure losses has a pressure loss per theoretical plate of less than 1.5 Torr.

It is of particular advantage to use the heat pump in combination with the column substantially free from pressure losses for separating mixtures of isomers.

The following are examples of separable mixtures of isomers: nitrotoluenes, nitrochlorobenzenes, nitrodichlorobenzenes, chloronitrotoluenes, polychlorobenzenes, nitroxylenes, chlorotoluenes, cresols, polychlorodiphenyls, toluidines.

The boiling points, as measured in ° C, of a few substances mentioned by way of example have the values shown in Table 1. With the exception of nitroxylenes, whose boiling points were measured at 760 Torr, all the other boiling points quoted were measured under a pressure of 200 Torr.

TABLE 1

| Boiling points (° C) at 200 Torr | | | | |
|---|---|---|---|---|
| 0 - nitrotoluene | : 171.4 | nitroxylenes= | | |
| m - " | : 181.0 | 2-nitro-1,3-dimethyl- | | |
| p - " | : 185.9 | benzene | : 225 | at |
| | | 2-nitro-1,4-dimethyl- | | |
| | | benzene | : 234 | 760 |
| m - nitrothlorobenzene | : 189.0 | 3-nitro-1,2-dimethyl- | | |
| p - " | : 191.0 | benzene | : 240 | Torr |
| o - " | : 196.7 | 4-nitro-1,3-dimethyl- | | |
| | | benzene | : 244 | |
| 2,5-nitrodichlorobenzene | : 208.3 | | | |
| | | o - chlorotoluene | : 115.0 | |
| 3,4- " | : 211.9 | m - " | : 116.6 | |
| 2,3- " | : 218.3 | p - " | : 117.1 | |
| 1,3-dichlorobenzene | : 125.9 | o - cresol | : 146.7 | |
| 1,4- " | : 128.3 | m - " | : 157.3 | |
| 1,2- " | : 133.4 | p - " | : 157.7 | |
| 1,3,5-trichlorobenzene | : 157.7 | 4-chlorodiphenyl | : 235 | |
| 1,2,4- " | : 162.0 | 2,2-dichlorodephenyl | : 240 | |
| 1,2,3- " | : 168.2 | 2,4-dichlorodiphenyl | : 243 | |
| | | 2,5-dichlorodiphenyl | : 252 | |
| 1,2,3,5-tetrachlorobenzene | : 193.7 | | | |
| 1,2,4,5- " | : 196.0 | o - toluidine | : 153.0 | |
| 1,2,3,4- " | : 198.0 | p - " | : 154.0 | |
| | | m - " | : 157.6 | |
| | | o - toluidine | : 153.0 | |
| | | diethyl-o-toluidine | : 157.5 | |
| | | monoethyl-o-toluidine | : 168.0 | |

The invention is described by way of example in the following with reference to the accompanying drawing, in which:

FIG. 1 diagrammatically illustrates a vacuum column in combination with a heat pump.

The product 2 to be separated is fed into a column 1 with a low pressure loss which is provided, for example, with a fabric packing. An evaporator 4 evaporates the bottom product. The vapour collected at the top of the column is compressed into a compressor 3. The vapour is then condensed in the evaporator or reboiler 4, giving off its heat of condensation. The condensed top product flows into a pump receiver 6. The bottom product is run off through a pipe 5. Only a small fraction of the heat required for heating the column, namely about 5 to 15%, is applied to the system through an evaporator or reboiler 7. By virtue of the low pressure loss between the top and bottom of the column 1, only a low compression ratio is required for compressing the vapour to a pressure which enables the latent heat to be given off in the evaporator 4 through a corresponding increase in the condensation temperature. Accordingly, the drive energy required for this purpose is limited. For this reason, it is appropriate to use a heat pump.

Instead of using a vacuum column with a fabric packing, it is also possible to use a grid packing, Pall rings, a trickle-film column with a helical spring filling or a trickle-film column with an expanded metal packing.

The compressor used in the heat pump can be a steam jet pump, a rotary piston compressor, a helical compressor, an axial turbo compressor or a radial turbo compressor.

EXAMPLE 1

An apparatus of the kind shown in the drawing is used for separating a m-nitrotoluene/p-nitrotoluene mixture with the following specification (figures based on p-nitrotoluene in % by weight):

Input: 90%, head take-off 56%, sump take-off 99.7%.

To carry out this separation, the column is operated at a sump temperature of 190° C and a sump pressure of 200 Torr and at a head temperature of 185° C and a head pressure of 200 Torr. After the head vapours have been compressed at a compression ratio of 1:1.55, they have a temperature of 200° C and a pressure of 310 Torr. Accordingly, the compressed head vapours can be used for heating the column.

EXAMPLE 2

The apparatus described in Example 1 is used for separating a p-nitrochlorobenzene/o-nitrochlorobenzene mixture p-nitrochlorobenzene in % by weight specification:
 input: 65.7
 head take off: 99.6
 sump take off: 0.4.

The separation was carried out under the following conditions:
 head pressure: 90 Torr head temperature: 166° C
 sump pressure: 120 Torr sump temperature: 180° C
 compression ratio: 1: 2.33
 pressure of the vapour: 210 Torr; temperature: 193° C

EXAMPLE 3

The apparatus described in Example 2 is used for separating a p-chlorobenzalchloride/p-chlorobenzotrichloride mixture specification (p-chlorobenzalchloride content in % by weight):
 input: 8.3
 head take-off: 50.0
 sump take-off 0.1
head pressure: 55 Torr; head temperature: 154° C
sump pressure 68 Torr; sump temperature: 165° C
compression ratio 1:2.0
pressure of the vapour: 110 Torr; temperature: 185° C.

What we claim is:

1. A process for separating mixtures of components which differ in boiling points by up to about 10° C, comprising distilling the mixture in a distillation column at a reduced pressure of above 10 Torr, supplying heat to the column in an amount of 5–15% of the heat required for heating the column by indirect heat exchange in a first reboiler, collecting the vapors at the top of the column, compressing said vapors and supplying the balance of the heat required for the distillation by indirect heat exchange by condensing the compressed vapors in a second reboiler evaporator.

2. Process of claim 1, wherein in the first evaporator and the second reboiler the indirect heat exchange is with the bottoms product of the distillation.

3. Process of claim 2, wherein the components differ in boiling by up to about 5° C, and the pressure loss per theoretical plate is less than 1.5 Torr.

4. Process of claim 3, wherein said vapors collected and compressed are all of the vapors from the top of the column.

5. Process of claim 2, wherein the pressure loss per theoretical plate is less than 1.5 Torr.

6. Process of claim 1, wherein the components differ in boiling by up to about 5° C.

7. Process of claim 6, wherein the pressure loss per theoretical plate is less than 1.5 Torr.

8. Process of claim 1, wherein the pressure loss per theoretical plate is less than 1.5 Torr.

9. A process as claimed in claim 1, when used for separating mixtures of isomers.

* * * * *

UNITED STATES PATENT AND TRADEMARK OFFICE
CERTIFICATE OF CORRECTION

PATENT NO. : 4,056,444

DATED : Nov. 1, 1977

INVENTOR(S) : Bodo Weicht, et al

It is certified that error appears in the above-identified patent and that said Letters Patent are hereby corrected as shown below:

Col. 4, line 31    Delete "evaporator" after "reboiler"

Signed and Sealed this

Fourteenth Day of March 1978

[SEAL]

Attest:

RUTH C. MASON
*Attesting Officer*

LUTRELLE F. PARKER
*Acting Commissioner of Patents and Trademarks*